(12) United States Patent
Merritt

(10) Patent No.: US 9,914,670 B1
(45) Date of Patent: Mar. 13, 2018

(54) PROCESS FOR MAKING A FULLY WATER-SOLUBLE HUMIC ACID GRANULE

(71) Applicant: Kevin Merritt, St. Augustine, FL (US)

(72) Inventor: Kevin Merritt, St. Augustine, FL (US)

( * ) Notice: Subject to any disclaimer, the term of this patent is extended or adjusted under 35 U.S.C. 154(b) by 0 days.

(21) Appl. No.: 14/738,865

(22) Filed: Jun. 13, 2015

Related U.S. Application Data

(60) Provisional application No. 62/013,789, filed on Jun. 18, 2014.

(51) Int. Cl.
*C05F 11/02* (2006.01)
*C05G 3/00* (2006.01)

(52) U.S. Cl.
CPC ............ *C05F 11/02* (2013.01); *C05G 3/0058* (2013.01)

(58) Field of Classification Search
CPC ................................ C05F 11/02; C05G 3/0058
See application file for complete search history.

(56) References Cited

U.S. PATENT DOCUMENTS

| | | | |
|---|---|---|---|
| 3,700,728 A | 10/1972 | Moschopedis et al. | |
| 3,932,166 A | 1/1976 | Vignovich et al. | |
| 4,015,972 A * | 4/1977 | Watkins ................... | C05D 3/00 106/773 |
| 4,459,149 A * | 7/1984 | Moran ................... | C08H 99/00 44/490 |
| 5,026,416 A | 6/1991 | Alexander | |
| 5,034,045 A * | 7/1991 | Alexander .............. | C05F 11/02 71/24 |
| 5,876,479 A | 3/1999 | Hedgpeth, IV | |
| 8,388,722 B2 | 3/2013 | Lynch et al. | |
| 2008/0216534 A1 | 9/2008 | Karr | |

FOREIGN PATENT DOCUMENTS

| | | | |
|---|---|---|---|
| CN | 101024590 | | 11/2010 |
| CN | 202148263 | | 2/2012 |
| CN | 101768019 | | 12/2012 |
| CN | 102898254 A | * | 1/2013 |
| CN | 101935243 | | 7/2013 |
| CN | 102875248 | | 10/2014 |
| EP | 1216976 | | 6/2002 |
| IN | 02359CH2010 | | 9/2010 |
| RU | 2491266 | | 1/2013 |
| WO | 1995033702 | | 12/1995 |
| WO | 2010094985 | | 8/2010 |
| WO | 2013057168 | | 4/2013 |

OTHER PUBLICATIONS

Humic Growth Solutions; Diamond-Grow Organic 100% Water Soluble Spray Dried Humic Acid Powder, pp. 1-2, Jacksonville, FL Dec. 31, 2013.
Grow More; Humic/Fulvic Acids, pp. 1-7, Dec. 31, 2003.

* cited by examiner

*Primary Examiner* — Jennifer A Smith
(74) *Attorney, Agent, or Firm* — Middleton Reutlinger

(57) ABSTRACT

Disclosed is a process for making a water-soluble granule enriched in humic acid. Disclosed also is a water-soluble granule enriched in humic acid. Such a granule is useful as an organic aid to crop growth, particularly in applications where solubility is desirable or necessary.

18 Claims, No Drawings

PROCESS FOR MAKING A FULLY WATER-SOLUBLE HUMIC ACID GRANULE

CROSS-REFERENCE TO RELATED APPLICATIONS

The present application claims priority on the basis of U.S. provisional application Ser. No. 62/013,789, filed Jun. 18, 2014, which is hereby incorporated by reference.

FIELD OF THE INVENTION

A process such as is described in various embodiments herein relates to a process for making a water-soluble granule enriched in humic acid. Such a granule is useful as an organic aid to crop growth, particularly in applications where solubility is desirable or necessary.

BACKGROUND OF THE INVENTION

Extraction of humic acid and related materials from carbonaceous raw materials such as Humalite has been practiced for years and is accordingly known in the art. Process steps vary, but the process output is generally a particulate material with suboptimal solubility in water.

Suboptimal solubility in water of particulate material enriched in humic acid and related materials presents a problem. Because organic and other producers typically prefer to apply mixtures that contain solvents such as water that are safe and healthful for both plants and workers, there is a need, long-felt by now, for a process for making a water-soluble granule enriched in humic acid.

SUMMARY OF EMBODIMENTS

Accordingly, a process such as is described in various embodiments herein unexpectedly provides a process for making a water-soluble granule enriched in humic acid, the process comprising:
  obtaining a sample of a carbonaceous substance comprising humic acid and one or more other substances;
  contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
  maintaining the sludge component in contact with the extraction component for a period of time sufficient for the extraction component to become relatively enriched in humic acid and the sludge component to become relatively depleted of humic acid;
  separating the sludge component from the extraction component;
  drying the extraction component, thereby forming a plurality of powder particles;
  compacting at least a portion of the plurality of powder particles under conditions wherein the at least a portion of the plurality of powder particles, as a result of the compacting, are made into a form of a granule;
thereby making a water-soluble granule enriched in humic acid.

Similarly, a water-soluble granule such as is described in various embodiments herein unexpectedly provides a water-soluble granule enriched in humic acid, the granule made by a process comprising:
  obtaining a sample of a carbonaceous substance comprising humic acid and one or more other substances;
  contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
  maintaining the sludge component in contact with the extraction component for a period of time sufficient for the extraction component to become relatively enriched in humic acid and the sludge component to become relatively depleted of humic acid;
  separating the sludge component from the extraction component;
  drying the extraction component, thereby forming a plurality of powder particles; and compacting at least a portion of the plurality of powder particles under conditions wherein the at least a portion of the plurality of powder particles, as a result of the compacting, are made into a form of a granule.

DETAILED DESCRIPTION

A process such as is described in various embodiments herein now will be described more fully hereinafter. A process such as is described in various embodiments herein may, however, be embodied in many different forms and should not be construed as limited to the embodiments set forth herein; rather, these embodiments are provided so that this disclosure will be thorough and complete, and will fully convey the scope of a process such as is described in various embodiments herein to those skilled in the art. As used in this specification and the claims, the singular forms "a," "an," and "the" include plural referents unless the context clearly dictates otherwise. When used in this specification and the claims as an adverb rather than a preposition, "about" means "approximately" and comprises the stated value and every value within 10% of that value; in other words, "about 100%" includes 90% and 110% and every value in between.

When used in this specification and the claims, a "water-soluble granule" refers to a granule that dissolves readily in water under typical conditions of use.

When used in this specification and the claims, a product is "enriched in humic acid" if the product possesses a higher concentration of humic acid than a raw material from which the product is made. A component becomes "enriched in humic acid" as the concentration of humic acid in the component increases. A component becomes "depleted of humic acid" as the concentration of humic acid in the component decreases.

When used in this specification and the claims, a "carbonaceous substance comprising humic acid and one or more other substances" refers to a carbonaceous substance that contains humic acid and that also contains one or more other substances other than humic acid. An example is Humalite. An example is lignite. An example is Leonardite.

Aspects of a process such as is described in various embodiments herein are further illustrated by the following examples, which are set forth to illustrate certain aspects of a process such as is described in various embodiments herein and are not to be construed as limiting thereof.

In an example, production of a granule enriched in humic acid was undertaken as a multi-step process comprising blending of raw material and an alkaline mixture in a blend tank; screening of the blended mixture that was made in the blend tank; drying of the liquid derived from screening of the blended mixture, thereby forming a fine powder; and conversion of the fine powder to form granules.

In an example, a blending of raw material with an alkaline mixture in a blend tank resulted in extraction of humic acid and other humic substances from the raw material. Hot water and caustic potash solution and Humalite were added to a thermally insulated tank in that order and blended. The hot water was at 160-180 degrees Fahrenheit. The caustic potash solution was 45% membrane grade. The mass ratio of hot water to caustic potash solution to Humalite was 73.7:5.8:20.5.

In an example, water, caustic potash solution and Humalite were placed into a thermally insulated tank to form a 42,000 lb mixture, which was then blended. The liquid phase was sampled, and a colorimetric assay for humic acid was performed on each sample, in which the amount of light absorbed was proportional to the concentration of humic acid.

In an example, a blended mixture prepared according to the paragraph immediately above consisted of liquid and sludge. This blended mixture was then pumped by a 3 HP motor to two 200 mesh screeners at a rate of ~40 gal/min (~350 lbs/min). It took ~120 minutes to screen 42000 lbs. The screener allowed liquids and very small particles to be passed through, but not the sludge. The amount of sludge varied, but typically the sludge was 5-7% of the total weight of the blended mixture.

In an example, the sludge still possessed some humic content and was given away to local farmers free of charge. The screened liquid, which had a density of 8.35-9 lb/gallon, was collected in an insulation tank, which had a capacity of 12500 gal. The liquid was pumped from the insulation tank to a spray dryer firing tank from which it was transferred to a spray dryer.

In an example, a spray dryer system comprised a burner, a dryer, two cyclone separators, a baghouse and a powder hopper. Liquid was processed at a rate of 14-16 gal/min. Hydraulic pressure-nozzle atomization was used in which liquid was passed through a filter and then through a hydraulic pressure pump. The pressure of the liquid was directly proportional to the force delivered by the hydraulic pressure pump and was generally 1500 psi but ranged from 1300-1700 psi depending on the moisture of the fine powder. The liquid was then forced through 8 nozzles to break the liquid into fine droplets. Filtered air was passed through a burner where it was heated to 600-650 degrees Fahrenheit. The temperature of the inlet air never exceeded 800 degrees Fahrenheit. The hot air met the liquid droplets in a co-current manner for a time of about 2 seconds. This time was enough to remove more than 85% of the moisture from the dryer to form a powder, which was collected in a common line. The air emerging out of the dryer still had some particles and was generally at 190-205 degrees Fahrenheit and never exceeded 250 degrees Fahrenheit. Heavier particles were collected using two cyclone separators in series and the lighter particles were collected using a baghouse filter. The hot gas, also called flue gas, was then emitted from the bag house; the hot gas consisted mostly of air and steam at 150-180 degrees Fahrenheit. The temperature of the exhaust never exceeded 250 degrees Fahrenheit. The powder from the common line was then transferred to a powder hopper. Moisture content of the powder was measured and kept between 11%-13%. When the moisture was below 11%, moisture content was increased in either of two ways, by reducing the temperature of the burner or by operating the hydraulic pressure pump at a higher capacity which in turn increased the flow rate of the liquid. When the moisture was above 13%, moisture content was decreased in either of two ways, by increasing the temperature of the burner or by operating the hydraulic pressure pump at a lower capacity which in turn decreased the flow rate of the liquid. The loose bulk density of the powder ranged from about 35 to about 42 pounds per cubic foot. The feed particle size distribution of a typical powder sample was as follows: 1.5% of the particles by weight were less than 100 microns; 15% of the particles by weight were less than 200 microns; 35% of the particles by weight were less than 270 microns; 55% of the particles by weight were less than 400 microns.

In an example, conversion of the fine powder to form granules was effected by an apparatus comprising a mechanical roller compactor, with pocket rollers at 8 rpm rotation and 1700 psi. Compacted granules were blown out pneumatically and screened by means of a vibratory screener to achieve relative uniformity of size distribution. For example, granules of 2.1 mm-4.0 mm were prepared for various agricultural uses, and granules of 0.8 mm-2.0 mm were prepared for horticultural use.

Resulting granules dissolved readily in water and have been found to aid plant growth in both agricultural and horticultural applications.

Aspects of a process such as is described in various embodiments herein are further illustrated by the following further examples, which are set forth to illustrate certain aspects of a process such as is described in various embodiments herein and are not to be construed as limiting thereof.

Further Example 1

A process for making a water-soluble granule enriched in humic acid, the process comprising:
  obtaining a sample of a carbonaceous substance comprising humic acid and one or more other substances;
  contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
  maintaining the sludge component in contact with the extraction component for a period of time sufficient for the extraction component to become relatively enriched in humic acid and the sludge component to become relatively depleted of humic acid; separating the sludge component from the extraction component;
  drying the extraction component, thereby forming a plurality of powder particles;
  compacting at least a portion of the plurality of powder particles under conditions wherein the at least a portion of the plurality of powder particles, as a result of the compacting, are made into a form of a granule;
thereby making a water-soluble granule enriched in humic acid.

Further Example 2

A process according to further example 1, wherein the carbonaceous substance comprises a coal and/or a claystone and/or a mudstone and/or a shale.

Further Example 3

A process according to further example 1, wherein the carbonaceous substance comprises a lignite and/or a Leonardite and/or a Humalite.

Further Example 4

A process according to further example 1, wherein the carbonaceous substance comprises a Humalite.

Further Example 5

A process according to further example 1, wherein the alkaline mixture comprises water.

Further Example 6

A process according to further example 1, wherein the alkaline mixture comprises a base.

Further Example 7

A process according to further example 1, wherein the alkaline mixture comprises sodium hydroxide or potassium hydroxide.

Further Example 8

A process according to further example 1, wherein the alkaline mixture comprises caustic potash solution.

Further Example 9

A process according to further example 1, wherein the alkaline mixture comprises, by mass, between about 10 and about 15 parts water, and about 1 part caustic potash solution, wherein the caustic potash solution is 45% membrane grade.

Further Example 10

A process according to further example 1, wherein the alkaline mixture comprises, by mass, about 73.7 parts water and about 5.8 parts caustic potash solution, wherein the caustic potash solution is 45% membrane grade.

Further Example 11

A process according to further example 1, wherein the mass ratio of the alkaline mixture to the sample is between about 75:25 and about 84:16.

Further Example 12

A process according to further example 1, wherein the mass ratio of the alkaline mixture to the sample is between about 78:22 and about 81:13.

Further Example 13

A process according to further example 1, wherein the mass ratio of the alkaline mixture to the sample is about 79.5:20.5.

Further Example 14

A process according to further example 1, wherein the sludge component is maintained in contact with the extraction component for between about 4 hours and about 12 hours.

Further Example 15

A process according to further example 1, wherein the sludge component is maintained in contact with the extraction component for between about 6 hours and about 10 hours.

Further Example 16

A process according to further example 1, wherein the sludge component is maintained in contact with the extraction component for about 8 hours.

Further Example 17

A process according to further example 1, wherein the sludge component is maintained in contact with the extraction component for a period of time sufficient for the extraction component to possess a humic acid content of at least about 6%.

Further Example 18

A process according to further example 1, wherein the sludge component is maintained in contact with the extraction component for a period of time sufficient for the extraction component to possess a humic acid content of at least about 14%.

Further Example 19

A process according to further example 1, wherein the sludge component is maintained in contact with the extraction component for a period of time sufficient for the extraction component to possess a humic acid content of at least about 17%.

Further Example 20

A process according to further example 1, wherein the sludge component is maintained in contact with the extraction component for a period of time sufficient for the extraction component to possess a humic acid content of at least about 18%.

Further Example 21

A process according to further example 1, wherein the separating is effected by filtration.

Further Example 22

A process according to further example 1, wherein the separating is effected by sedimentation.

Further Example 23

A process according to further example 1, wherein the drying is effected by spray drying.

Further Example 24

A process according to further example 1, wherein the drying is effected by spray drying, and wherein the spray drying is characterized by an inlet temperature and an outlet temperature, and wherein the inlet temperature is between about 500 degrees Fahrenheit and about 800 degrees Fahrenheit, and wherein the outlet temperature is between about 150 degrees Fahrenheit and about 250 degrees Fahrenheit.

Further Example 25

A process according to further example 1, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further Example 26

A process according to further example 1, wherein the plurality of powder particles is characterized by a moisture content, and wherein the moisture content is between about 9% and about 15%.

Further Example 27

A process according to further example 1, wherein the plurality of powder particles is characterized by a moisture content, and wherein the moisture content is between about 10% and about 14%.

Further Example 28

A process according to further example 1, wherein the plurality of powder particles is characterized by a moisture content, and wherein the moisture content is between about 11% and about 13%.

Further Example 29

A process according to further example 1, wherein the plurality of powder particles is characterized by a loose bulk density, and wherein the loose bulk density is between about 28 and about 49 pounds per cubic foot.

Further Example 30

A process according to further example 1, wherein the plurality of powder particles is characterized by a loose bulk density, and wherein the loose bulk density is between about 31.5 and about 45.5 pounds per cubic foot.

Further Example 31

A process according to further example 1, wherein the plurality of powder particles is characterized by a loose bulk density, and wherein the loose bulk density is between about 35 and about 42 pounds per cubic foot.

Further Example 32

A process according to further example 1, wherein the plurality of powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further Example 33

A process according to further example 1, wherein the compacting is effected by an apparatus comprising a roller compactor.

Further Example 34

A process according to further example 1, wherein the compacting is effected by an apparatus comprising a roller compactor, and wherein the speed of the roller compactor is about 8 rpm.

Further Example 35

A process according to further example 1, wherein the compacting is effected by an apparatus comprising a roller compactor, and wherein the pressure exerted by the roller compactor is about 1700 psi.

Further Example 36

A process according to further example 1, wherein the compacting is effected by an apparatus comprising a roller compactor, wherein the speed of the roller compactor is about 8 rpm, and wherein the pressure exerted by the roller compactor is about 1700 psi.

Further Example 37

A process according to further example 1, wherein the granule is between about 0.5 mm and about 4.5 mm.

Further Example 38

A process according to further example 1, wherein the granule is between about 0.8 mm and about 4.0 mm.

Further Example 39

A process according to further example 1, wherein the granule is between about 0.8 mm and about 2.0 mm.

Further Example 40

A process according to further example 1, wherein the granule is between about 2.1 mm and about 4.0 mm.

Further Example 41

A process according to further example 1, wherein at least about 75% of the granule is dissolved in five minutes when the granule is submerged in one liter of water at a temperature of 25 degrees Celsius.

Further Example 42

A process according to further example 1, wherein at least about 90% of the granule is dissolved in five minutes when the granule is submerged in one liter of water at a temperature of 25 degrees Celsius.

Further Example 43

A process according to further example 1, wherein at least about 95% of the granule is dissolved in five minutes when the granule is submerged in one liter of water at a temperature of 25 degrees Celsius.

Further Example 44

A process according to further example 1, wherein at least about 99% of the granule is dissolved in five minutes when the granule is submerged in one liter of water at a temperature of 25 degrees Celsius.

Further Example 45

A process according to further example 1, wherein 100% of the granule is dissolved in five minutes when the granule is submerged in one liter of water at a temperature of 25 degrees Celsius.

Further Example 46

A process according to further example 1, wherein at least about 75% of the granule is dissolved in one minute when the granule is submerged in one liter of water at a temperature of 25 degrees Celsius.

Further Example 47

A process according to further example 1, wherein at least about 90% of the granule is dissolved in one minute when the granule is submerged in one liter of water at a temperature of 25 degrees Celsius.

Further Example 48

A process according to further example 1, wherein at least about 95% of the granule is dissolved in one minute when the granule is submerged in one liter of water at a temperature of 25 degrees Celsius.

Further Example 49

A process according to further example 1, wherein at least about 99% of the granule is dissolved in one minute when the granule is submerged in one liter of water at a temperature of 25 degrees Celsius.

Further Example 50

A process according to further example 1, wherein 100% of the granule is dissolved in one minute when the granule is submerged in one liter of water at a temperature of 25 degrees Celsius.

Aspects of a water-soluble granule such as is described in various embodiments herein are further illustrated by the following further examples, which are set forth to illustrate certain aspects of a process such as is described in various embodiments herein and are not to be construed as limiting thereof.

Further Example 51

A water-soluble granule enriched in humic acid, the granule made by a process comprising:

obtaining a sample of a carbonaceous substance comprising humic acid and one or more other substances;

contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;

maintaining the sludge component in contact with the extraction component for a period of time sufficient for the extraction component to become relatively enriched in humic acid and the sludge component to become relatively depleted of humic acid;

separating the sludge component from the extraction component;

drying the extraction component, thereby forming a plurality of powder particles; and compacting at least a portion of the plurality of powder particles under conditions wherein the at least a portion of the plurality of powder particles, as a result of the compacting, are made into a form of a granule.

Further Example 52

A granule according to further example 51, wherein the carbonaceous substance comprises a coal and/or a claystone and/or a mudstone and/or a shale.

Further Example 53

A granule according to further example 51, wherein the carbonaceous substance comprises a lignite and/or a Leonardite and/or a Humalite.

Further Example 54

A granule according to further example 51, wherein the carbonaceous substance comprises a Humalite.

Further Example 55

A granule according to further example 51, wherein the alkaline mixture comprises water.

Further Example 56

A granule according to further example 51, wherein the alkaline mixture comprises a base.

Further Example 57

A granule according to further example 51, wherein the alkaline mixture comprises sodium hydroxide or potassium hydroxide.

Further Example 58

A granule according to further example 51, wherein the alkaline mixture comprises caustic potash solution.

Further Example 59

A granule according to further example 51, wherein the alkaline mixture comprises, by mass, between about 10 and about 15 parts water, and about 1 part caustic potash solution, wherein the caustic potash solution is 45% membrane grade.

Further Example 60

A granule according to further example 51, wherein the alkaline mixture comprises, by mass, about 73.7 parts water and about 5.8 parts caustic potash solution, wherein the caustic potash solution is 45% membrane grade.

Further Example 61

A granule according to further example 51, wherein the mass ratio of the alkaline mixture to the sample is between about 75:25 and about 84:16.

Further Example 62

A granule according to further example 51, wherein the mass ratio of the alkaline mixture to the sample is between about 78:22 and about 81:13.

Further Example 63

A granule according to further example 51, wherein the mass ratio of the alkaline mixture to the sample is about 79.5:20.5.

Further Example 64

A granule according to further example 51, wherein the sludge component is maintained in contact with the extraction component for between about 4 hours and about 12 hours.

Further Example 65

A granule according to further example 51, wherein the sludge component is maintained in contact with the extraction component for between about 6 hours and about 10 hours.

Further Example 66

A granule according to further example 51, wherein the sludge component is maintained in contact with the extraction component for about 8 hours.

Further Example 67

A granule according to further example 51, wherein the sludge component is maintained in contact with the extraction component for a period of time sufficient for the extraction component to possess a humic acid content of at least about 6%.

Further Example 68

A granule according to further example 51, wherein the sludge component is maintained in contact with the extraction component for a period of time sufficient for the extraction component to possess a humic acid content of at least about 14%.

Further Example 69

A granule according to further example 51, wherein the sludge component is maintained in contact with the extraction component for a period of time sufficient for the extraction component to possess a humic acid content of at least about 17%.

Further Example 70

A granule according to further example 51, wherein the sludge component is maintained in contact with the extraction component for a period of time sufficient for the extraction component to possess a humic acid content of at least about 18%.

Further Example 71

A granule according to further example 51, wherein the separating is effected by filtration.

Further Example 72

A granule according to further example 51, wherein the separating is effected by sedimentation.

Further Example 73

A granule according to further example 51, wherein the drying is effected by spray drying.

Further Example 74

A granule according to further example 51, wherein the drying is effected by spray drying, and wherein the spray drying is characterized by an inlet temperature and an outlet temperature, and wherein the inlet temperature is between about 500 degrees Fahrenheit and about 800 degrees Fahrenheit, and wherein the outlet temperature is between about 150 degrees Fahrenheit and about 250 degrees Fahrenheit.

Further Example 75

A granule according to further example 51, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further Example 76

A granule according to further example 51, wherein the plurality of powder particles is characterized by a moisture content, and wherein the moisture content is between about 9% and about 15%.

Further Example 77

A granule according to further example 51, wherein the plurality of powder particles is characterized by a moisture content, and wherein the moisture content is between about 10% and about 14%.

Further Example 78

A granule according to further example 51, wherein the plurality of powder particles is characterized by a moisture content, and wherein the moisture content is between about 11% and about 13%.

Further Example 79

A granule according to further example 51, wherein the plurality of powder particles is characterized by a loose bulk density, and wherein the loose bulk density is between about 28 and about 49 pounds per cubic foot.

Further Example 80

A granule according to further example 51, wherein the plurality of powder particles is characterized by a loose bulk density, and wherein the loose bulk density is between about 31.5 and about 45.5 pounds per cubic foot.

Further Example 81

A granule according to further example 51, wherein the plurality of powder particles is characterized by a loose bulk density, and wherein the loose bulk density is between about 35 and about 42 pounds per cubic foot.

Further Example 82

A granule according to further example 51, wherein the plurality of powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further Example 83

A granule according to further example 51, wherein the compacting is effected by an apparatus comprising a roller compactor.

Further Example 84

A granule according to further example 51, wherein the compacting is effected by an apparatus comprising a roller compactor, and wherein the speed of the roller compactor is about 8 rpm.

Further Example 85

A granule according to further example 51, wherein the compacting is effected by an apparatus comprising a roller compactor, and wherein the pressure exerted by the roller compactor is about 1700 psi.

Further Example 86

A granule according to further example 51, wherein the compacting is effected by an apparatus comprising a roller compactor, wherein the speed of the roller compactor is about 8 rpm, and wherein the pressure exerted by the roller compactor is about 1700 psi.

Further Example 87

A granule according to further example 51, wherein the granule is between about 0.5 mm and about 4.5 mm.

Further Example 88

A granule according to further example 51, wherein the granule is between about 0.8 mm and about 4.0 mm.

Further Example 89

A granule according to further example 51, wherein the granule is between about 0.8 mm and about 2.0 mm.

Further Example 90

A granule according to further example 51, wherein the granule is between about 2.1 mm and about 4.0 mm.

Further Example 91

A granule according to further example 51, wherein at least about 75% of the granule is dissolved in five minutes when the granule is submerged in one liter of water at a temperature of 25 degrees Celsius.

Further Example 92

A granule according to further example 51, wherein at least about 90% of the granule is dissolved in five minutes when the granule is submerged in one liter of water at a temperature of 25 degrees Celsius.

Further Example 93

A granule according to further example 51, wherein at least about 95% of the granule is dissolved in five minutes when the granule is submerged in one liter of water at a temperature of 25 degrees Celsius.

Further Example 94

A granule according to further example 51, wherein at least about 99% of the granule is dissolved in five minutes when the granule is submerged in one liter of water at a temperature of 25 degrees Celsius.

Further Example 95

A granule according to further example 51, wherein 100% of the granule is dissolved in five minutes when the granule is submerged in one liter of water at a temperature of 25 degrees Celsius.

Further Example 96

A granule according to further example 51, wherein at least about 75% of the granule is dissolved in one minute when the granule is submerged in one liter of water at a temperature of 25 degrees Celsius.

Further Example 97

A granule according to further example 51, wherein at least about 90% of the granule is dissolved in one minute when the granule is submerged in one liter of water at a temperature of 25 degrees Celsius.

Further Example 98

A granule according to further example 51, wherein at least about 95% of the granule is dissolved in one minute when the granule is submerged in one liter of water at a temperature of 25 degrees Celsius.

Further Example 99

A granule according to further example 51, wherein at least about 99% of the granule is dissolved in one minute when the granule is submerged in one liter of water at a temperature of 25 degrees Celsius.

Further Example 100

A granule according to further example 51, wherein 100% of the granule is dissolved in one minute when the granule is submerged in one liter of water at a temperature of 25 degrees Celsius.

Aspects of a process such as is described in various embodiments herein are further illustrated by the following further example, which is set forth to illustrate certain aspects of a process such as is described in various embodiments herein and are not to be construed as limiting thereof.

Further Example 101

A process for making a water-soluble granule enriched in humic acid, the process comprising:
(a) obtaining a sample of a carbonaceous substance comprising humic acid and one or more other substances, wherein the carbonaceous substance comprises a coal and/or a claystone and/or a mudstone and/or a shale and/or a lignite and/or a Leonardite and/or a Humalite;
(b) contacting the sample with an amount of an alkaline mixture, wherein the mass ratio of the alkaline mixture to the sample is between about 75:25 and about 84:16, and wherein the alkaline mixture comprises sodium hydroxide or potassium hydroxide or caustic potash solution, thereby forming an extraction mixture, the extraction mixture consisting essentially of a sludge component, the sludge component comprising, predominantly, the sample, and an extraction component, the extraction component comprising, predominantly, the alkaline mixture;
(c) maintaining the sludge component in contact with the extraction component for a period of time sufficient for the extraction component to become relatively enriched in humic acid and the sludge component to become relatively depleted of humic acid, and wherein the period of time is sufficient for the extraction component to possess a humic acid content of at least about 6%;
(d) separating the sludge component from the extraction component, wherein the separating is effected by filtration and/or by sedimentation and/or by spray-drying;
(e) drying the extraction component, thereby forming a plurality of powder particles, wherein the drying is effected by spray drying, and wherein the spray drying is characterized by an inlet temperature and an outlet temperature, and wherein the inlet temperature is between about 500 degrees Fahrenheit and about 800 degrees Fahrenheit, and wherein the outlet temperature is between about 150 degrees Fahrenheit and about 250 degrees Fahrenheit; wherein the plurality of powder particles is characterized by a moisture content, and wherein the moisture content is between about 9% and about 15%; wherein the plurality of powder particles is characterized by a loose bulk density, and wherein the loose bulk density is between about 28 and about 49 pounds per cubic foot; and wherein the plurality of powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns; and
(f) compacting at least a portion of the plurality of powder particles under conditions wherein the at least a portion of the plurality of powder particles, as a result of the compacting, are made into a form of a granule; wherein the compacting is effected by an apparatus comprising a roller compactor, wherein the speed of the roller compactor is about 8 rpm, and wherein the pressure exerted by the roller compactor is about 1700 psi; wherein the granule is between about 0.5 mm and about 4.5 mm; and wherein at least about 75% of the granule is dissolved in five minutes when the granule is submerged in one liter of water at a temperature of 25 degrees Celsius;
thereby making a water-soluble granule enriched in humic acid.

Many modifications and other embodiments of a process such as is described in various embodiments herein will come to mind to one skilled in the art to which this disclosed process pertains having the benefit of the teachings presented in the foregoing description. Therefore, it is to be understood that a process such as is described in various embodiments herein is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:
1. A process for making a water-soluble granule enriched in humic acid, the process comprising:
obtaining a sample of a carbonaceous substance comprising humic acid and one or more other substances;
contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
maintaining the sludge component in contact with the extraction component for a period of time sufficient for the extraction component to become relatively enriched in humic acid and the sludge component to become relatively depleted of humic acid;
separating the sludge component from the extraction component;
spray drying the extraction component, thereby forming a plurality of powder particles,
wherein the plurality of powder particles is characterized by a moisture content, and wherein the moisture content is between about 9% and about 15%;
compacting at least a portion of the plurality of powder particles under conditions wherein the at least a portion of the plurality of powder particles, as a result of the compacting, are made into a form of a granule;
thereby making a water-soluble granule enriched in humic acid.

2. A process according to claim 1, wherein the carbonaceous substance comprises a coal and/or a claystone and/or a mudstone and/or a shale and/or a lignite and/or a Leonardite and/or a Humalite.

3. A process according to claim 1, wherein the alkaline mixture comprises sodium hydroxide or potassium hydroxide solution.

4. A process according to claim 1, wherein the alkaline mixture comprises, by mass, between about 10 and about 15 parts water, and about 1 part caustic potash solution, wherein the caustic potash solution is 45% membrane grade.

5. A process according to claim 1, wherein the alkaline mixture comprises, by mass, about 73.7 parts water and about 5.8 parts caustic potash solution, wherein the caustic potash solution is 45% membrane grade.

6. A process according to claim 1, wherein the mass ratio of the alkaline mixture to the sample is between about 75:25 and about 84:16.

7. A process according to claim 1, wherein the sludge component is maintained in contact with the extraction component for between about 4 hours and about 12 hours.

8. A process according to claim 1, wherein the sludge component is maintained in contact with the extraction component for a period of time sufficient for the extraction component to possess a humic acid content of at least about 6%.

9. A process according to claim 1, wherein the separating is effected by filtration and/or by sedimentation and/or by spray-drying.

10. A process according to claim 1, wherein the spray drying is characterized by an inlet temperature and an outlet temperature, and wherein the inlet temperature is between about 500 degrees Fahrenheit and about 800 degrees Fahrenheit, and wherein the outlet temperature is between about 150 degrees Fahrenheit and about 250 degrees Fahrenheit.

11. A process according to claim 1, wherein the compacting is effected by an apparatus comprising a roller compactor.

12. A process according to claim 1, wherein the compacting is effected by an apparatus comprising a roller compactor, and wherein the pressure exerted by the roller compactor is about 1700 psi.

13. A process according to claim 1, wherein the compacting is effected by an apparatus comprising a roller compactor, wherein the speed of the roller compactor is about 8 rpm, and wherein the pressure exerted by the roller compactor is about 1700 psi.

14. A process according to claim 1, wherein the granule is between about 0.5 mm and about 4.5 mm.

15. A process according to claim 1, wherein at least about 75% of the granule is dissolved in five minutes when the granule is submerged in one liter of water at a temperature of 25 degrees Celsius.

16. A process for making a water-soluble granule enriched in humic acid, the process comprising:
   (a) obtaining a sample of a carbonaceous substance comprising humic acid and one or more other substances, wherein the carbonaceous substance comprises a coal and/or a claystone and/or a mudstone and/or a shale and/or a lignite and/or a Leonardite and/or a Humalite;
   (b) contacting the sample with an amount of an alkaline mixture, wherein the mass ratio of the alkaline mixture to the sample is between about 75:25 and about 84:16, and wherein the alkaline mixture comprises sodium hydroxide or potassium hydroxide solution, thereby forming an extraction mixture, the extraction mixture consisting essentially of a sludge component, the sludge component comprising, predominantly, the sample, and an extraction component, the extraction component comprising, predominantly, the alkaline mixture;
   (c) maintaining the sludge component in contact with the extraction component for a period of time sufficient for the extraction component to become relatively enriched in humic acid and the sludge component to become relatively depleted of humic acid, and wherein the period of time is sufficient for the extraction component to possess a humic acid content of at least about 6%;
   (d) separating the sludge component from the extraction component, wherein the separating is effected by filtration and/or by sedimentation and/or by spray-drying;
   (e) drying the extraction component, thereby forming a plurality of powder particles, wherein the drying is effected by spray drying, and wherein the spray drying is characterized by an inlet temperature and an outlet temperature, and wherein the inlet temperature is between about 500 degrees Fahrenheit and about 800 degrees Fahrenheit, and wherein the outlet temperature is between about 150 degrees Fahrenheit and about 250 degrees Fahrenheit; wherein the plurality of powder particles is characterized by a moisture content, and wherein the moisture content is between about 9% and about 15%; wherein the plurality of powder particles is characterized by a loose bulk density, and wherein the loose bulk density is between about 28 and about 49 pounds per cubic foot; and wherein the plurality of powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns; and
   (f) compacting at least a portion of the plurality of powder particles under conditions wherein the at least a portion of the plurality of powder particles, as a result of the compacting, are made into a form of a granule; wherein the compacting is effected by an apparatus comprising a roller compactor, wherein the speed of the roller compactor is about 8 rpm, and wherein the pressure exerted by the roller compactor is about 1700 psi; wherein the granule is between about 0.5 mm and about 4.5 mm; and wherein at least about 75% of the granule is dissolved in five minutes when the granule is submerged in one liter of water at a temperature of 25 degrees Celsius;
thereby making a water-soluble granule enriched in humic acid.

17. A process for making a water-soluble granule enriched in humic acid, the process comprising:
   obtaining a sample of a carbonaceous substance comprising humic acid and one or more other substances;
   contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
   maintaining the sludge component in contact with the extraction component for a period of time sufficient for the extraction component to become relatively enriched in humic acid and the sludge component to become relatively depleted of humic acid;

separating the sludge component from the extraction component;

spray drying the extraction component, thereby forming a plurality of powder particles,
  wherein the plurality of powder particles is characterized by a loose bulk density, and wherein the loose bulk density is between about 28 and about 49 pounds per cubic foot;

compacting at least a portion of the plurality of powder particles under conditions wherein the at least a portion of the plurality of powder particles, as a result of the compacting, are made into a form of a granule;

thereby making a water-soluble granule enriched in humic acid.

18. A process for making a water-soluble granule enriched in humic acid, the process comprising:

obtaining a sample of a carbonaceous substance comprising humic acid and one or more other substances;

contacting the sample with an amount of an alkaline mixture, thereby forming an extraction mixture, the extraction mixture consisting essentially of a sludge component, the sludge component comprising, predominantly, the sample, and an extraction component, the ex traction component comprising, predominantly, the alkaline mixture;

maintaining the sludge component in contact with the extraction component for a period of time sufficient for the extraction component to become relatively enriched in humic acid and the sludge component to become relatively depleted of humic acid;

separating the sludge component from the extraction component;

spray drying the extraction component, thereby forming a plurality of powder particles,
  wherein the plurality of powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns;

compacting at least a portion of the plurality of powder particles under conditions wherein the at least a portion of the plurality of powder particles, as a result of the compacting, are made into a form of a granule;

thereby making a water-soluble granule enriched in humic acid.

* * * * *